United States Patent
Gadini et al.

(10) Patent No.: US 6,255,934 B1
(45) Date of Patent: Jul. 3, 2001

(54) BISTABLE ACTUATION DEVICE

(75) Inventors: Costanzo Gadini, Casale Monferrato; Daniele Cerruti, Fontanetto Po, both of (IT)

(73) Assignee: Eltek S.p.A., Monferrato (IT)

( * ) Notice: Subject to any disclaimer, the term of this patent is extended or adjusted under 35 U.S.C. 154(b) by 0 days.

(21) Appl. No.: 09/363,865

(22) Filed: Jul. 29, 1999

(30) Foreign Application Priority Data

Jul. 31, 1998 (IT) .......................................... TO98A000671

(51) Int. Cl.[7] ........................ H01H 61/01; H01H 61/013; F16T 1/02
(52) U.S. Cl. .......................... 337/393; 337/123; 337/139; 337/141; 337/394; 337/395; 236/59
(58) Field of Search .............................. 337/116, 31, 123, 337/139, 141, 298, 382, 393–397, 306, 324; 236/41, 60, 87, 96, 43, 5, 19, 33, 66, 101, 59

(56) References Cited

U.S. PATENT DOCUMENTS

| | | | |
|---|---|---|---|
| 3,622,929 | * 11/1971 | Barden et al. ........................... | 337/3 |
| 3,860,277 | 1/1975 | Wang . | |
| 4,072,918 | * 2/1978 | Read, Jr. ............................... | 335/236 |
| 4,320,371 | * 3/1982 | Coyle et al. ........................... | 335/256 |
| 4,533,890 | * 8/1985 | Patel ..................................... | 335/234 |
| 4,655,489 | 4/1987 | Bisbing . | |
| 4,703,960 | 11/1987 | Lense . | |
| 4,759,528 | * 7/1988 | Morris .............................. | 251/129.06 |
| 4,928,028 | * 5/1990 | Leibovich ............................... | 310/23 |
| 5,125,371 | * 6/1992 | Erickson et al. .................. | 123/90.12 |
| 5,572,869 | * 11/1996 | Schantz et al. ......................... | 60/528 |
| 5,641,060 | * 6/1997 | Tracey .................................. | 200/526 |
| 5,656,986 | * 8/1997 | Sassone et al. ...................... | 337/116 |
| 5,897,055 | * 4/1999 | Saur et al. ........................... | 337/393 |
| 5,968,395 | * 10/1999 | Gadini et al. ........................ | 219/510 |

* cited by examiner

Primary Examiner—Leo P. Picard
Assistant Examiner—Anatoly Vortman
(74) Attorney, Agent, or Firm—Levine & Mandelbaum

(57) ABSTRACT

An actuation device capable of changing its operating condition between a stable rest position and a stable work position has a monostable actuation unit with a body and at least a shaft movable as a function of the energization available to the actuation unit, and a kinematic motion assembly for converting the movement of the shaft into a bistable actuation, the kinematic motion assembly including a slider linearly movable in response to action of the shaft and a device for converting subsequent linear movements of the shaft in the passage of the slider between the stable positions and the maintaining of the same. According to the invention, the device is arranged sideways to the slider with reference to the motional direction of the latter, where subsequent movements of the slider cause at least a displacement of a hooking element being part of the device between at least a first and a second position, in the first position the device maintains the slider in the stable work position and in the second position the device allows the slider to pass in the stable rest position.

32 Claims, 6 Drawing Sheets

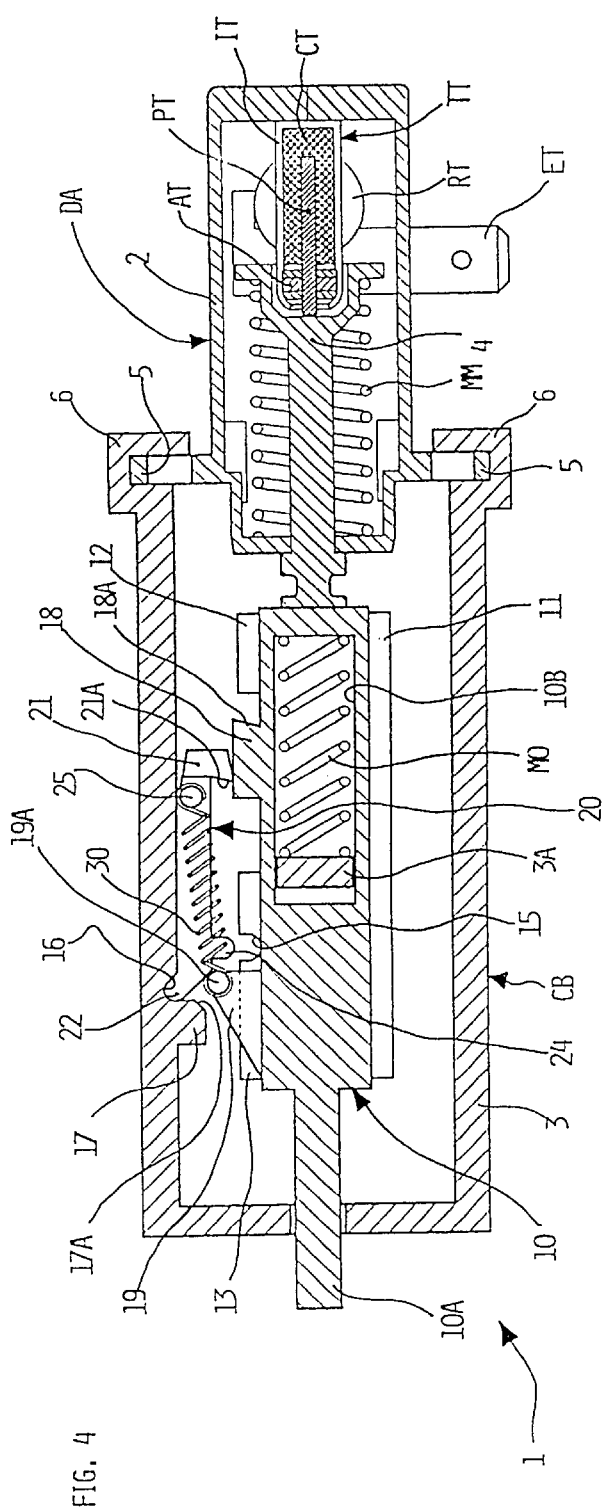
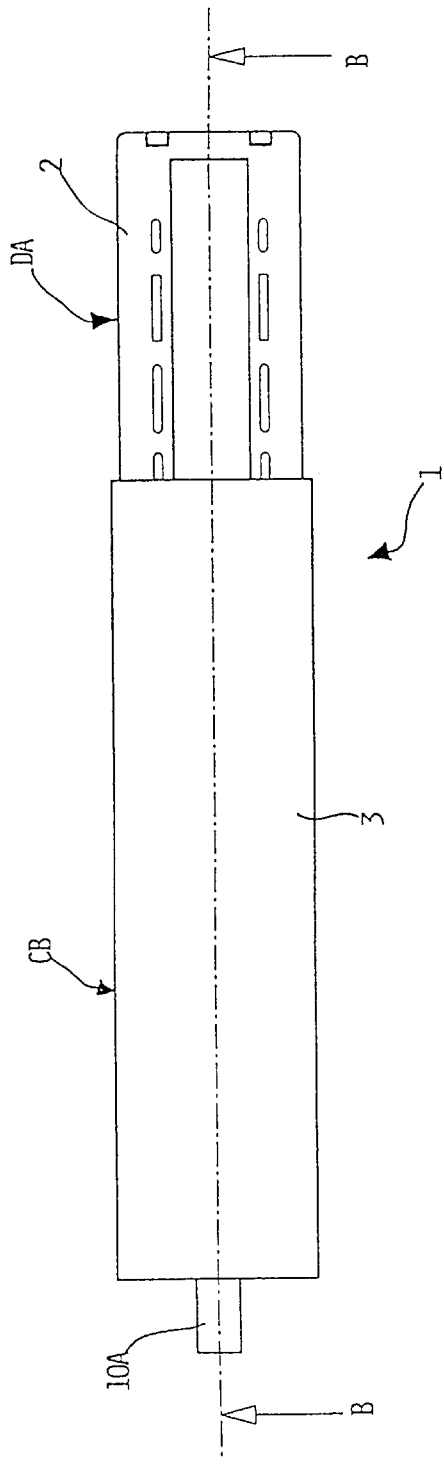
FIG. 4
FIG. 2

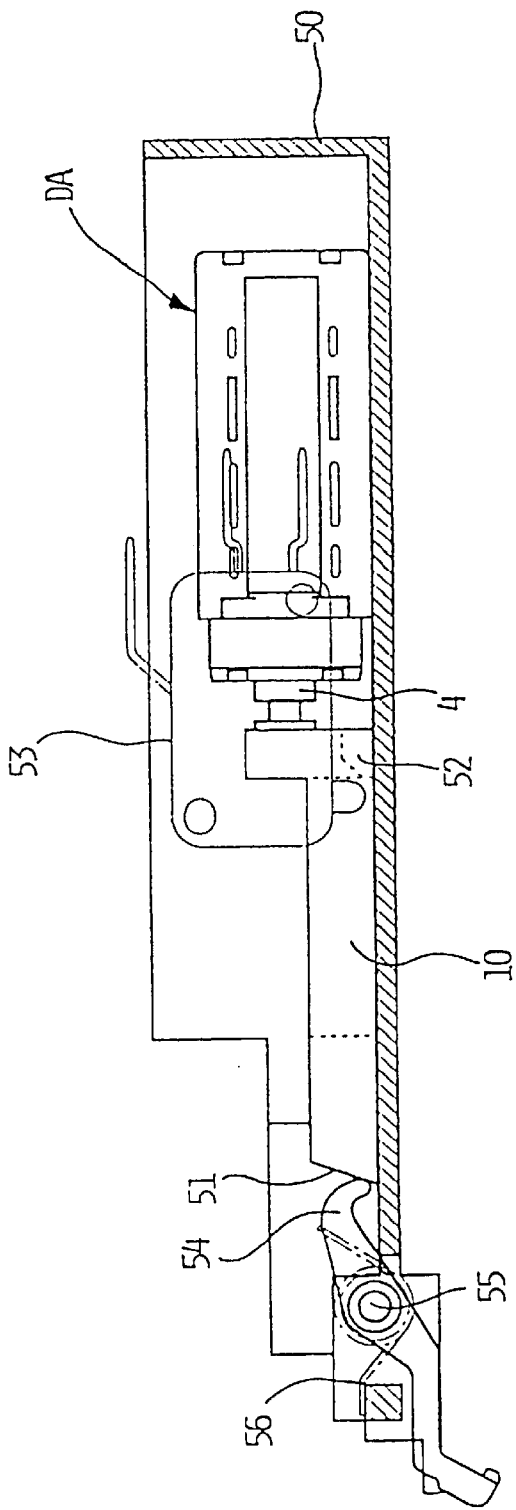
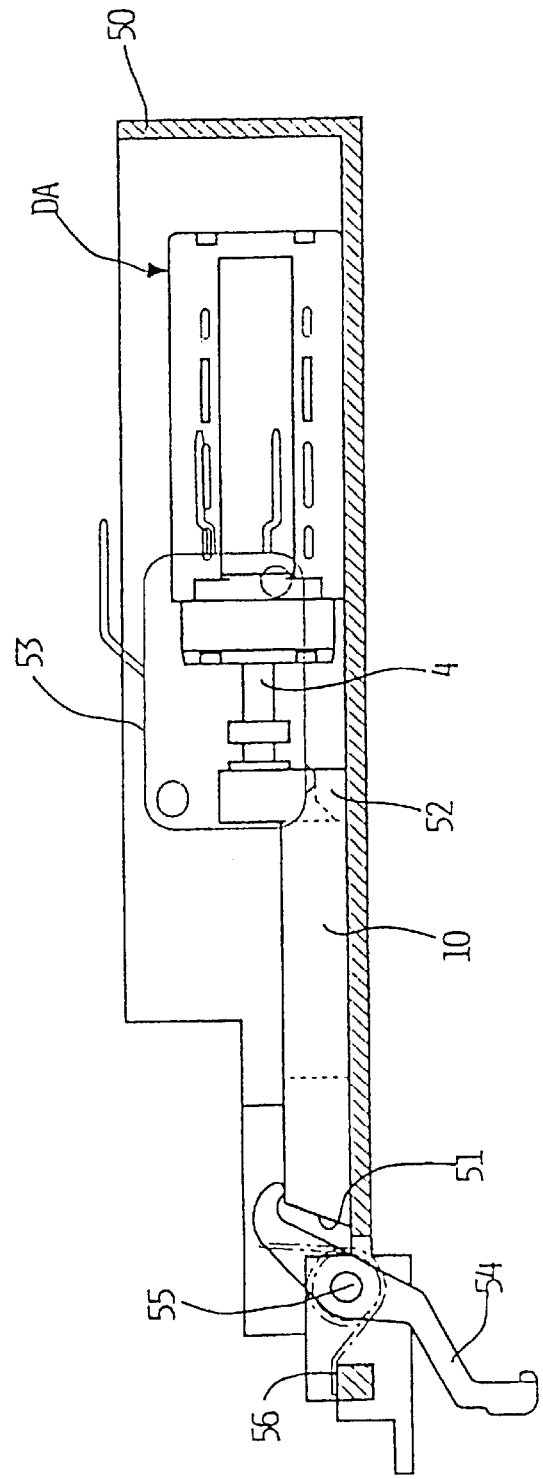
FIG. 9
FIG. 10

BISTABLE ACTUATION DEVICE

BACKGROUND OF THE INVENTION

The present invention relates to a bistable actuation device. As known, an actuation device of the above mentioned type is able, during a first operation cycle, to reach a determined work condition and maintain it and, then go back to its previous work condition following a subsequent operation cycle. Such actuation devices, which have actuation means as well as means for maintaining the conditions reached at the end of the first operation cycle, are opposed to the monostable devices or actuation systems, which are not equipped with means for maintaining the work position reached at the time the electric supply is interrupted.

Bistable actuation devices have a plurality of applications in practice; for instance, they are employed to manufacture door-lock systems for domestic appliances, such as washing-machines or cooking apparatuses, in order to avoid dangerous operations for users.

Bistable actuation devices are known, wherein the condition reached is maintained by means of a pair of bimetallic elements; however, such systems have no adequate means for functionality control, so that their operation, which is based on the surrounding temperature, can be easily affected by external heat sources. Electromagnetic bistable actuation systems are also known, which require the use of complex circuits for controlling either their polarity inversion or electric switching.

Another typical problem according to the state of the art arises from the complexity of the components used in bistable devices and their arrangement; for instance, the use of electromagnets makes such actuation devices complicated, bulky and expensive.

A further problem is also due to the fact that many known actuation devices, having a small size, are not able to develop a considerable force and/or have no kinematic motion assemblies able to oppose high forces when the actuator is no longer electrically supplied.

From U.S. Pat. No. 5,656,989 a device is also known, consisting of a monostable actuator, in particular of the electro-thermal type, having kinematic means for maintaining a work position when there is no electric supply; such means comprise at least a housing body wherein there are arranged in series:

- a first element, which slides linearly in the body under the thrust produced by the actuator;
- a second element, which slides and rotates inside the body under the thrust produced by the first element, with which an actuating shaft is associated;
- a third element, which slides linearly within the body under the thrust produced by the second rotatable element and is acted upon by a spring.

The first two elements have slanting toothed surfaces, which convert the linear motion of the first element into a linear and rotary motion of the second element; the second element has then means able to engage with the ends of guides being provided for the movement of the first element, which are obtained on an inner surface of the body and which allow the maintaining of a position for the second and third elements.

According to the device disclosed in U.S. Pat. No. 5,656, 989, a linear motion produced by the actuator has to be transferred to an angular motion of a part of the thrust kinematic motion, in order to reach and maintain a stable work condition. Such an at least partial conversion of the motion exerted by the actuator, i.e. from linear to angular or rotary, may entail slight losses in the actuation force.

Moreover, the solution described in the above document, though being sophisticated and functional, requires accurate manufacture of the various elements, which results in a device cost sometimes not justified by its application. The above solution also requires good lubrication of the various components to warrant optimal operation.

A further constraint of U.S. Pat. No. 5,656,989 is that the described device necessarily requires a closed housing for the kinematic motion assembly which should have a certain length for containing all three elements and an internal circular section, and consequently high space requirements.

Moreover, the device disclosed in U.S. Pat. No. 5,656,989 has the drawback of not being easily manually resettable from outside, for instance with a proper mechanical tool if required (such as in the event of a blackout, a fault of the monostable actuator, etc.); such a drawback may be particularly problematic should the device be used in door lock systems of domestic appliances.

SUMMARY OF THE INVENTION

The present invention has the purpose of solving the above mentioned drawbacks.

Within this framework, a first aim of the invention is to provide a bistable actuation device which has a simple structure and a simple low-cost manufacture.

A second aim of the present invention is to provide a bistable actuation device which does not require special maintenance operations and which is not subject to force losses due to motion conversions.

A third aim of the present invention is to provide a bistable actuation device which has no special constraints as to the method of housing the kinematic motion assembly used for allowing maintenance of a work position after it is reached.

A fourth aim of the present invention is to provide a bistable actuation device which can be easily resettable either manually or mechanically, if required.

These and other aims are attained, according to the present invention, by an actuation device having the features of the annexed claims, which form an integral part of the present description.

Further aims, features and advantages of the present invention will become apparent from the following detailed description and the annexed drawings, which are supplied by way of non-limiting example.

DESCRIPTION OF THE DRAWINGS

FIGS. 1 and 2 show a side view and a plan view, respectively, of the device according to the present invention, in a first operating condition;

FIGS. 3 and 4 show a section of the device according to the present invention, taken along the axis A—A of FIG. 1 and axis B—B of FIG. 2, respectively;

FIGS. 9 and 10 show the application represented in FIG. 8 in two different work conditions, in a section taken along a plane orthogonal to the one of FIG. 5;

DESCRIPTION OF THE PREFERRED EMBODIMENT

In FIGS. 1–4, number 1 indicates the actuation device according to the present invention as a whole, which consists essentially of a linear actuator DA of the monostable type, as commonly known, to which a bistable kinematic motion assembly CB is associated as an adaptor.

Number 2 indicates a first body having a substantially square section, being part of said monostable actuator DA, while 3 indicates a second body having a substantially rectangular section, which contains the kinematic means forming the bistable adaptor CB. For example, the monostable actuator contained in the body 2 may be of the thermal type, as commonly known and which does not require here a more detailed description.

Figure 3:
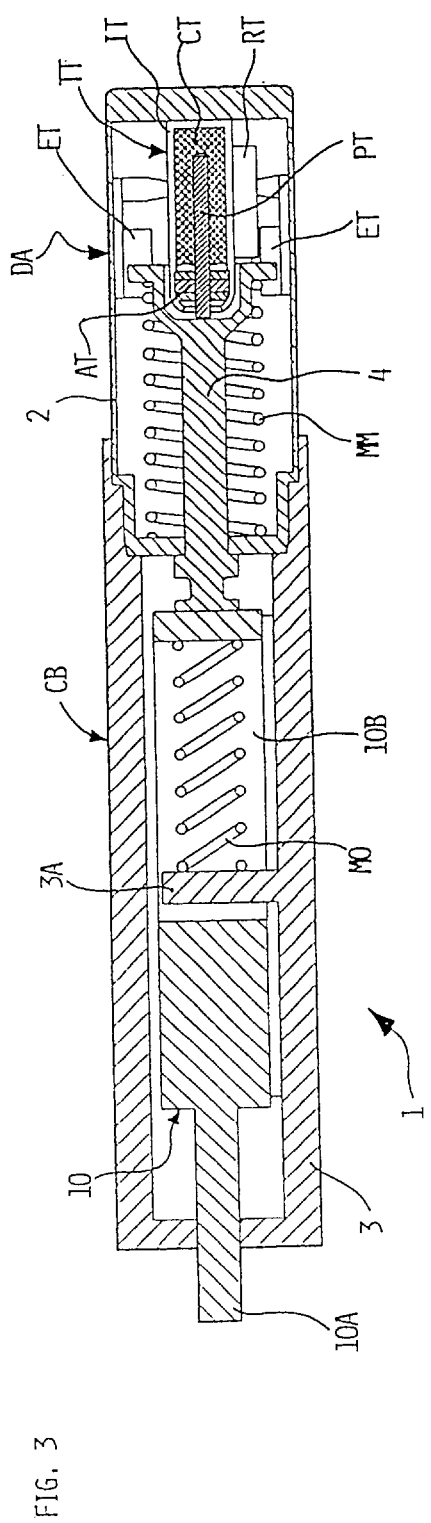
Figure 1:
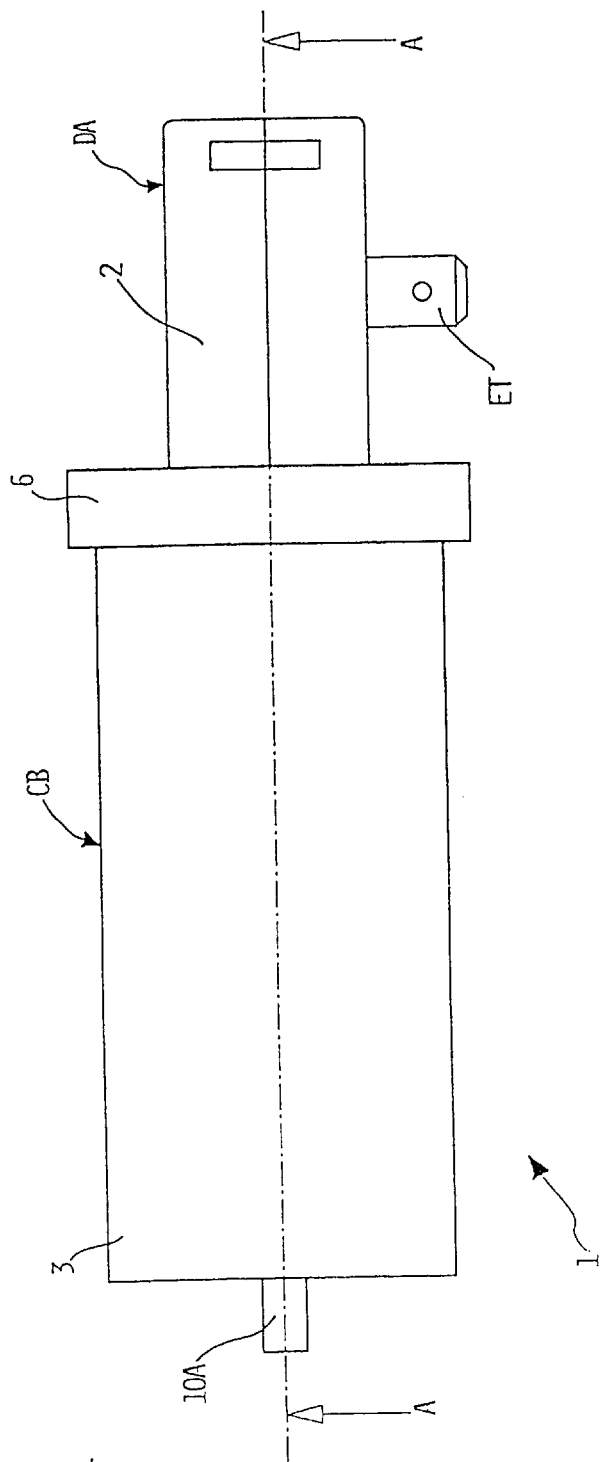

It is enough to clarify, with reference to FIGS. 3 and 4, that in the given example a thermal actuator TT is provided, comprising a housing IT, which is thermally and electrically connected to an electric heater RT, such as a PTC, being supplied through two terminals ET. The conductive housing IT of the thermal actuator delimits a sealed chamber filled with a thermally expansible material CT, such as wax, wherein a small piston PT is at least partially dipped; on the end of said chamber proper seal means are provided, such as packed Teflon® washers and metal washers, indicated with AT as a whole, through which the small piston PT can slide linearly.

Volume expansion of the expansible material CT, when subject to a temperature increase of the housing IT, induced by the electric heater RT, determines a linear movement of the small piston PT towards the outside of the housing IT. In the specific instance, the piston PT of the thermal actuator TT contained in the body 2 is able to produce a linear motion of a shaft, one end of which exits from the body 2 itself; said shaft, indicated with 4, is subject to the opposite reaction of an elastic element MM inside the body 2, such as a spiral spring, also apt to cause a backing of the piston PT inside the thermal actuator TT when the heating cycle of the latter ceases.

As it results from the above, the body 2 and its relevant internal components (thermal actuator TT with heater RT and electric contacts ET, shaft 4 and relevant spring MM) form in their whole a monostable electric actuator DA, i.e. capable of generating a thrust only when electrically supplied, but not able to maintain the reached position when the electric supply ceases.

As it can be seen in the example represented in FIGS. 3 and 4, the body 2 is mechanically coupled with the body 3 in correspondence with an open end of the latter; in particular, with 5 and 6 two flanges are indicated, being part of the bodies 2 and 3 respectively, which have a fast hooking system of the bayonet type, for their mutual coupling; flanges 5 and 6 may eventually have coaxial holes for anchoring the device 1; the body 3 may eventually also have flanges (not shown), which are apt to fasten the device 1 as a whole.

As said above, the body 3 has an internal kinematic motion assembly which allows for maintaining a work position, being reached after the actuation of the electric actuator DA, also at the end of the electric supply of the latter; the body 3 and its relevant internal kinematic motion assembly therefore constitute the cited bistable adaptor CB, which is apt to convert the monostable actuator DA in the bistable actuation device 1 according to the present invention.

The cited kinematic motion assembly comprises two elements being movable within the body 3, which consist of a slider 10 and a hooking element 20 (FIG. 4). It has to be noticed that, in the following, terms such as "upwards", "downwards", "upper", "lower", "front", "side", "right", "left", etc., are intended as simple references to the arrangement of the means being represented in the figures (in particular by looking at the device 1 with the electric terminals ET of the actuator DA turned downwards), and shall in no way be considered restrictive for the purposes of the description related to the embodiment and the operation of the device according to the present invention.

The slider 10 delimits on one end an actuation shaft 10A, which is inserted in a through-hole in the wall of the body 3 opposite the opening being in correspondence with the actuator DA; such a shaft 10A is used to generate the motion for which the device according to the present invention is provided to, such as activating a closing bolt of the door of a domestic appliance.

As can be seen in FIGS. 3 and 4, the slider 10 has a cavity 10B, wherein a striker 3A is inserted integral with the body 3; an elastic element, such as a spiral spring MO, is located in the cavity 10B, which operates between an end of the cavity itself and the striker 3A. Thus, the slider 10 can linearly slide inside the body 3, following a thrust produced by the shaft 4 in opposition to the action of the spring MO; the slider 10 is constrained in such a linear movement not only by the striker 3A, but also by guiding elements indicated with 11, 12 and 13 (FIG. 4); in the example represented in the figures, such guiding elements are formed by protrusions on the inner surface of a side wall of the body 3.

As can be seen in FIG. 4, a first seat or cavity 5, having substantially a downwards turned semicircular shape, is defined on the upper surface of one of such guiding elements, in particular the farthest one from the shaft 4, being indicated with 13. A second seat or cavity 16 having substantially an upwards turned semicircular shape is defined on the inner side of the upper wall of the body 3; the part of said seat 16 being farthest from the shaft 4 is delimited by a relief 17, extending downwards from the inner side of the upper wall of the body 3 and having a slanting surface 17A. A hooking relief 18 having a slanting side wall 18A is defined in the upper part of the slider 10; the slider 10 also has a second relief 19 on the top, having a projection 19A, such as a stake which has a substantially cylindrical shape; such a projection 19A is provided for anchoring an end of a spiral spring 30, whose functions will be better clarified in the following.

The hooking element 20 has a relatively slim body and is freely inserted, i.e. without any specific constraints, between the slider 10 and the upper wall of the body 3. Such a hooking element 20 has an end extending downwards to delimit a hook 21, having a slanting surface 21A which is suitable for coupling with the slanting wall 18A of the hooking relief 18. In the opposite part of the hooking element 20 an upper extension 22 is defined, which is directed upwards and has a semicircular shape being apt to engage in the seat 16; the surface extending between the top of such an extension 22 and the lower wall of the element 20 is inclined and apt to cooperate with the end of the relief 19 turned towards it.

From the lower surface of the hooking element 20 a lower extension 24 departs, which has a semicircular shape and being apt to engage in the seat 15 delimited on the upper surface of the guiding means 13. As it will be further explained, the extensions 22 and 24 of the hooking element 20 are apt to alternatively engage with and angularly rotate in the seats 15 and 16 delimited in the body 3, depending upon the operating condition of the device 1 according to the present invention. It should be appreciated that the seats 15–16 and the extensions 22–24 may have a different shape (for example a triangular shape resting on a vertex), provided they are apt to allow for a suitable angular motion.

Finally, the hooking element 20 has a side projection 25 next to the hook 21, such as a substantially cylindrical stake, being provided for anchoring the second end of the spring 30. It should be appreciated that the dimensions and the arrangements (width, length, thickness, relative distances, strokes, etc.) of the components mentioned above are suitable pre-calculated, in order to allow the operation of the device according to the present invention, as further described.

The starting operating condition of the device 1 according to the present invention is as shown by way of example in FIG. 4. Under this condition, the thermal actuator TT contained in the body 2 is not electrically supplied and is only subject to the reaction of the spring MM; therefore, the end of the shaft 4 is in a back position. As can be seen, the hooking element 20 is so positioned to have its upper extension 22 being pivoted in the seat 16 of the body 3, and maintained therein by the end of the relief 19 of the slider 10, which end is in contact with the above cited slanting surface which extends from the extension 22 to the lower wall of the element 20; on the other end, the front hook 21 rests on top of the relief 18 of the slider 10.

As can be seen, in this situation, the upper surface of the hooking element 20 is substantially adjacent to the inner surface of the upper wall of the body 3, in particular parallel to it; the spring 30 has a first directional line extending from the projection 19A to the projection 25 from the bottom to the top. Under this condition, the spring MO tends to back the slider 10, i.e. to maintain it in contact with the end of the shaft 4, while the spring 30 tends to bring downwards the end of the hooking element 20 whereon the hook 21 is located, which therefore results in being pressed on the relief 18 of the slider 10.

Figure 5:
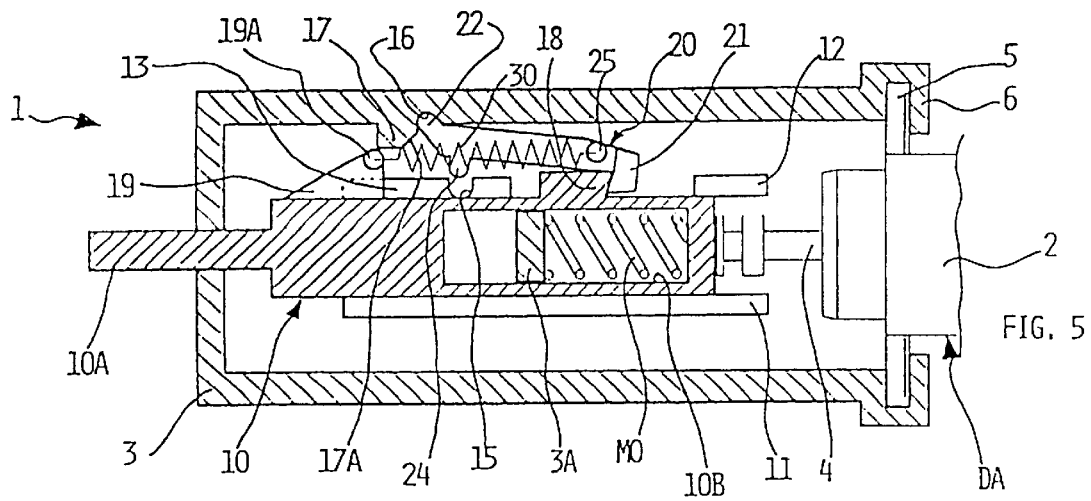
FIGS. 5, 6 and 7 show partial views in section of the device according to the present invention in a second, third and fourth operating conditions, respectively.

When the actuator DA is supplied, the shaft 4 starts moving towards the outside of the body 2 and to linearly displace the slider 10 in the relevant guide elements 11, 12 and 13, until the position shown in FIG. 5 is reached. The motion of the slider 10 causes the relief 18 to slide underneath the hook 21, until the end of the element 20 whereon such a hook 21 is located is free to move downwards, due to the action of the spring 30; the upper extension 22 defined on the end of the hooking element 20 remains engaged in the seat 16.

As can be seen, during this phase, the hooking element 20 performs a first swing about a fulcrum point which is substantially realized in 16, and the spring 30 takes a second directional line, being substantially parallel to the sliding plane of the slider 10. When the electric supply to the actuator 4D ceases, the shaft 4 does no longer operates a thrust and goes back under the force of the relevant spring being present inside the body 2, with a relevant minimum backing also of the slider 10 under the action of the spring MO. In this way, the slanting surface 21A of the hook 21 (FIG. 4) can couple accurately to with the slanting front surface 18A (FIG. 4) of the relief 18 of the slider 10, so as to reach the condition represented in FIG. 6.

It should be noticed that the slanting surface 18A practically realizes a seat whereon the end of the hooking element 20 can be inserted and swing: in this way, along with the action of the spring 30, the part of the hooking element 20 bearing the extensions 22 and 24 is brought downwards; consequently, the extension 22 exits the seat 16 while the extension 24 enters the seat 15. As can be seen, during this phase the hooking element 20 performs a second swing about a fulcrum point which is substantially realized in 18A, and the spring 30 maintains a directional line substantially parallel to the sliding plane of the slider 10; the displacement of the extension 24 in the seat 15 so changes the fulcrum point of the hooking element 20.

Now the spring 30 tends to bring upwards the end of the element 20 which carries the hook 21, but such a movement is not allowed due to the inclination of the coupling surfaces between the hook 21 itself and the relief 18 (i.e. surfaces 21A and 18A shown in FIG. 4), which hinders a disengagement between the two parts. Therefore, under this condition and also due to a lack of thrust from the shaft 4, the slider 10 cannot go backward any more under the action of the spring MO and is maintained in position by the hooking element 20, which constrains the slider 10 to the body 3; in particular, the end of the hooking element 20 carrying the hook 21 retains the slider 10, while the other end carrying the lower extension 24 remains constrained in the seat 15 of the body 3. Therefore, under this condition the slider 10 and the relevant shaft 10A can maintain the position reached following the first actuation cycle of the actuator DA, even if the latter is no longer electrically supplied.

Figure 6:
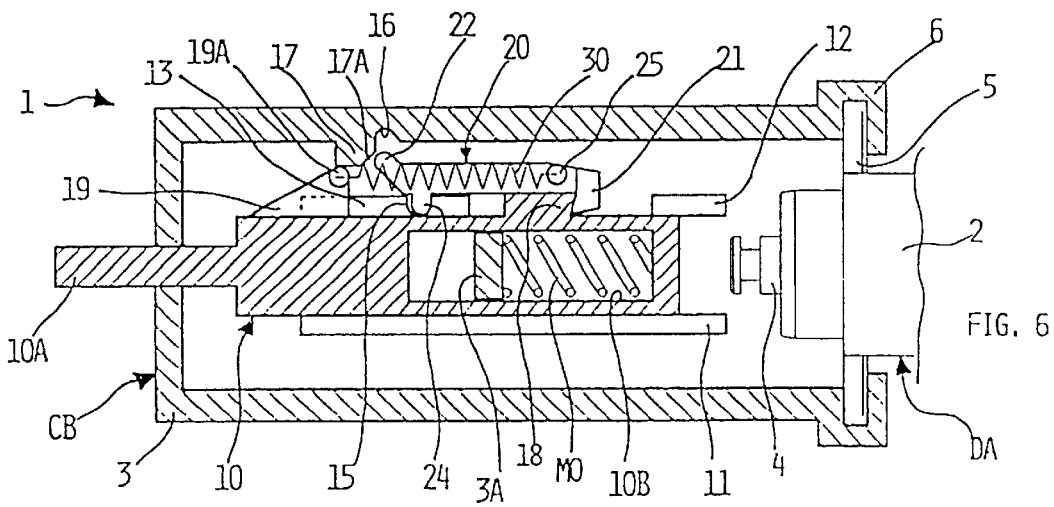

The switching, i.e. the change of the balance state of FIG. 6, is obtained through a subsequent electric supply of the actuator DA. Such a new electric supply determines, as described above, a new thrust on the slider 10, which is slightly displaced forward, until causing a disengagement between the slanting surfaces 21A and 18A of the hook 21 and the relief 18, respectively; during this phase, the lower extension 24 remains inserted in the seat 15 and the opposite end of the element 20 can move upwards, until the hook 21 overcomes the height of the relief 18.

Figure 7:
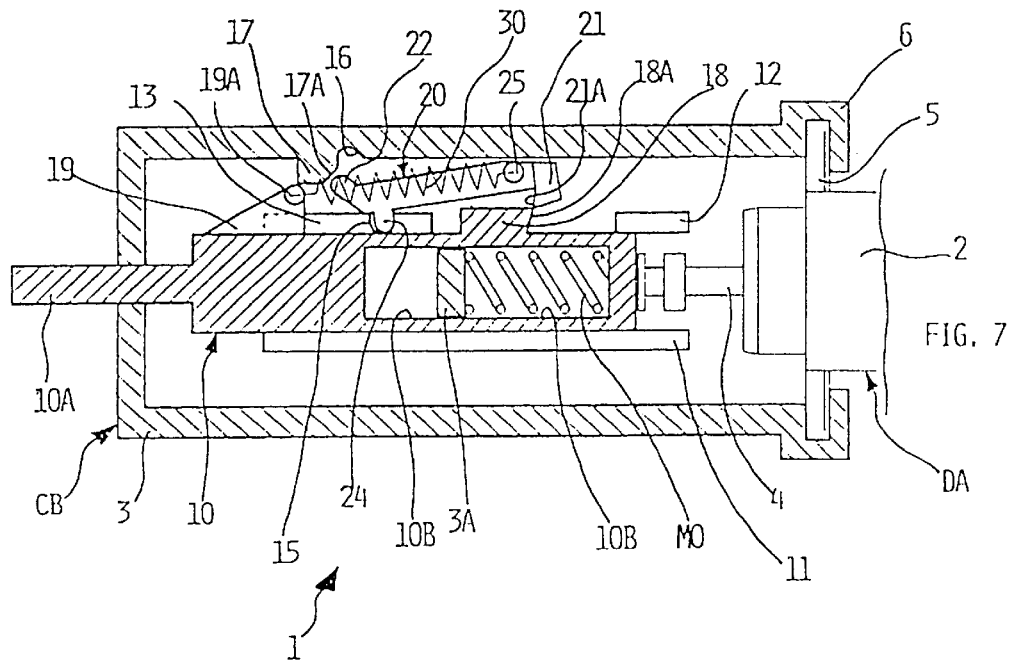

As can be seen, during this phase the hooking element 20 performs a third swing around a fulcrum point which is substantially realized in 24, and the spring 30 takes a third directional line extending from the projection 19A to the projection 25 from the bottom to the top. It should be appreciated how, under this condition, the slider 10 is no longer constrained to the body 3 and the spring MO is now tending to back the slider itself; however, the slider 10 is maintained in the reached position by the thrust produced by the shaft 4. This situation is substantially represented in FIG. 7.

When the electric supply to the actuator DA ceases, as described above, the shaft 4 returns to its backward position and no longer operates a thrust on the slider 10. The slider 10 is then able to go backward through the action of the spring MO; following such a gradual backing, the end of the relief 19 of the slider 10 comes in contact with the slanting surface which extends from the extension 22 to the lower wall of the element 20, so pushing upwards the end of the latter which carries the extension 22. The extension 22, also guided by the surface 17A, is therefore taken back in the seat 16 and the device 1 goes back to its start condition as shown in FIG. 4.

According to the above, it is clear how the described configuration of the adaptor CB allows for obtaining a bistable system having highly reduced dimensions; the monostable actuator DA, particularly of the type being commonly available on the market, can be easily transformed through said adaptor in a bistable actuator, in a modular way, so that the distinct components DA and CB can be assembled and tested separately; accordingly, it is also possible to have less stock, by assembling the actuator DA to the kinematic motion assembly CB only when necessary.

It is obvious from the above how the described kinematic motion assembly has the peculiarity of using, as a hooking means, a freely swinging or oscillating element; in particular, the hooking element 20 has no fixed constraints of angular positioning, being it simply inserted between the slider 10 with the relevant guiding means 11–13 and a wall defining the seat 16 and the relief 17 (which in the example of FIGS. 1–4 is the upper wall of the body 3), and it is free to oscillate, with a change of its fulcrum point, both in clockwise and counterclockwise directions; to this purpose, the hooking element 20 provides the extensions 22, 24 (and 21) apt to selectively engage the relevant seats 16 and 15.

Another peculiarity of the described kinematic motion assembly is the change, during the various operation phases of the device, of the directional line of the spring or other similar resilient element, which is used for inducing opposite angular movements in the hooking element 20.

Finally, it is obvious that the components of the described kinematic motion assembly can be obtained through very simple and cost-effective industrial processes, without requiring a housing to fully cover the kinematic motion assembly. This is also obvious from FIGS. 8–10, where the device according to the present invention is represented in a possible use, i.e. in a lock system for the door of a household appliance, such as a baking oven; in said figure the reference numbers of the previous figures are used, for indicating technically equivalent elements.

As can be seen from such an application, the device according to the present invention is not equipped with the body 3, though providing all the essential elements of the previously described kinematic motion assembly CB.

Figure 8:
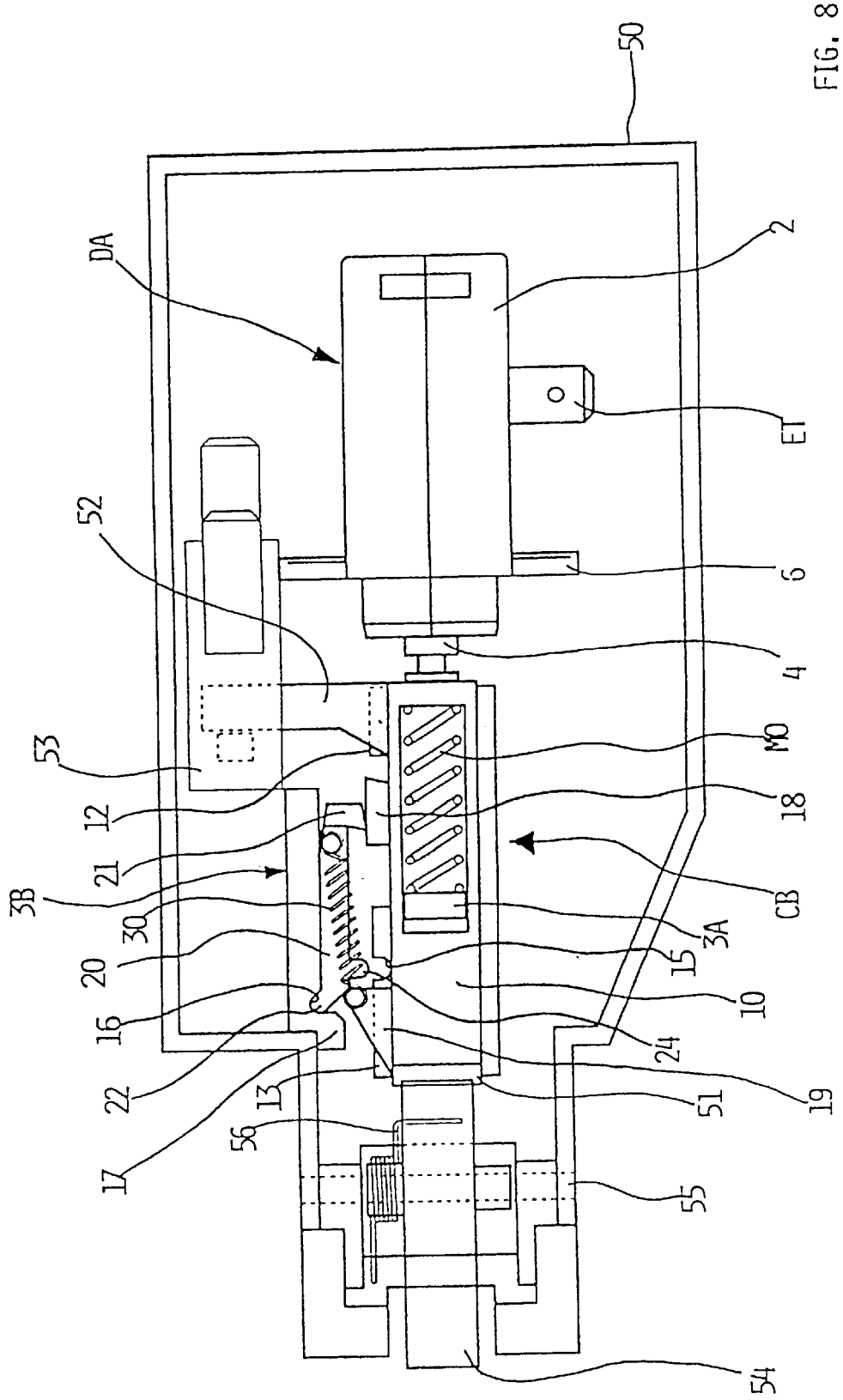
FIG. 8 shows a view in partial section of a particularly advantageous application of the device according to the present invention.

In FIG. 8, number 50 indicates a generic housing of the locking system, for example realized in molded plastics, to which the body 2 of the monostable actuator DA is fastened. The elements of the kinematic motion assembly CB are disposed inside of the housing. It should be appreciated how the upper wall of the body 3 of FIGS. 1–7 is replaced here by a simple septum indicated with 3B, wherein the seat 16 and the relief 17 are defined.

The configuration of the slider 10 shown in FIG. 8 is slightly different with respect to the previous one; in this instance, in fact, the end 51 of the slider 10 opposite to the end in contact with the shaft 4 of the actuator DA defines an actuation shaft having a slanting surface; moreover, the slider has a side extension 52, which is apt to produce the switching of a micro-switch indicated with 53, whose function is to inform the control system of the domestic appliance about the actual locking state of the door (not shown).

The end 51 of the slider 10 is provided for causing the motion of a hook 54, being angularly movable around a pin 55, in opposition to the action of a spring 56; the hook 54 is able to take a position which allows for the door opening (FIG. 9) or a position determining its locking in the closed position.

The operating condition of the locking system shown in FIGS. 8–9 corresponds substantially to the one of FIGS. 1–4; as it can be seen, in this case, the shaft 4 is in a back position, like the slider 10, and the hook 54 is in a first operating position. Following the operation of the actuator DA, the slider 10 is pushed by the shaft 4 to let the upper end of the hook 54 to slide along the slanting surface of the end 51 of the slider 10, up to the position shown in FIG. 10 of door locking; in this phase, also the closing of the micro-switch 53 is determined by the side extension 52, which signals the achievement (and the subsequent maintaining) of the locking condition.

It is clear that during this phase the kinematic motion assembly CB of the door-lock system behaves exactly as previously described with reference to FIG. 5. When the electric supply of the actuator DA ceases, the locked position is maintained, by virtue of the presence of the kinematic motion assembly CB, as described above with reference to FIG. 6. Finally, when the control system of the household appliance provides for the door release, the actuator DA is newly electrically supplied for the switching of the kinematic motion assembly CB, as described with reference to FIG. 7.

Thus, the shaft 4 and the slider 10 are free to go backward and let the hook 54 return to its starting position (FIG. 9) for the door opening; the control system of the domestic appliance is informed by the opening of the micro-switch 53 that the release condition has been reached, as determined by the backing of the extension 52.

Figure 11:
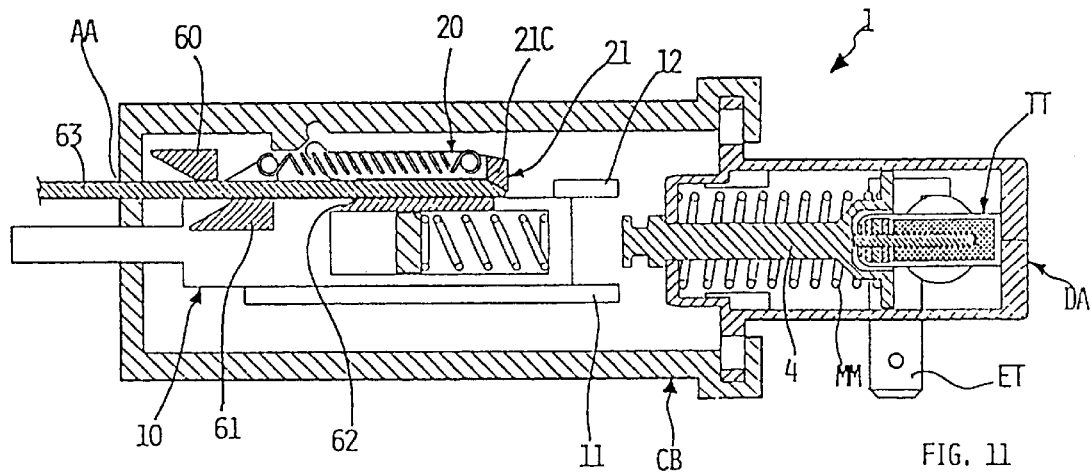
FIGS. 11, 12 and 13 show views in section of the device according to a variant embodiment of the present invention, under different conditions.
Figure 12:
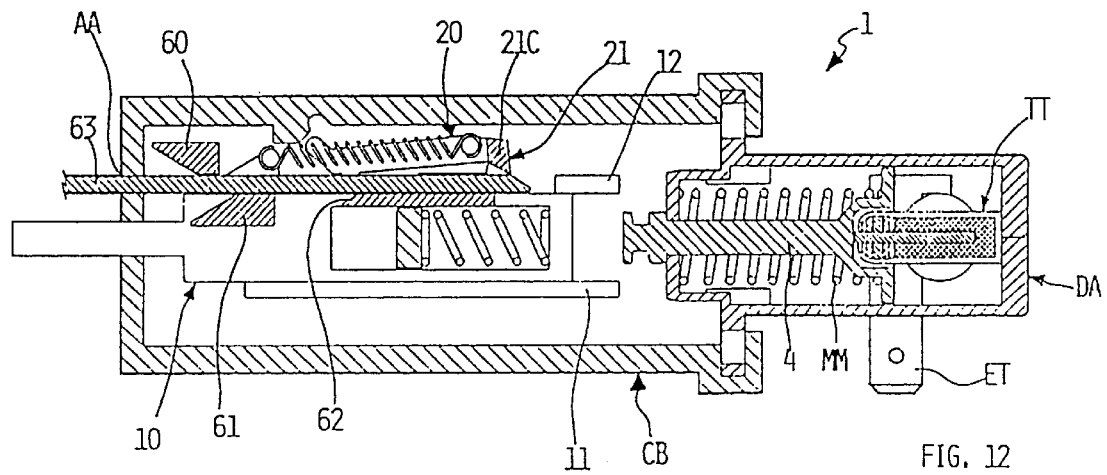
Figure 13:
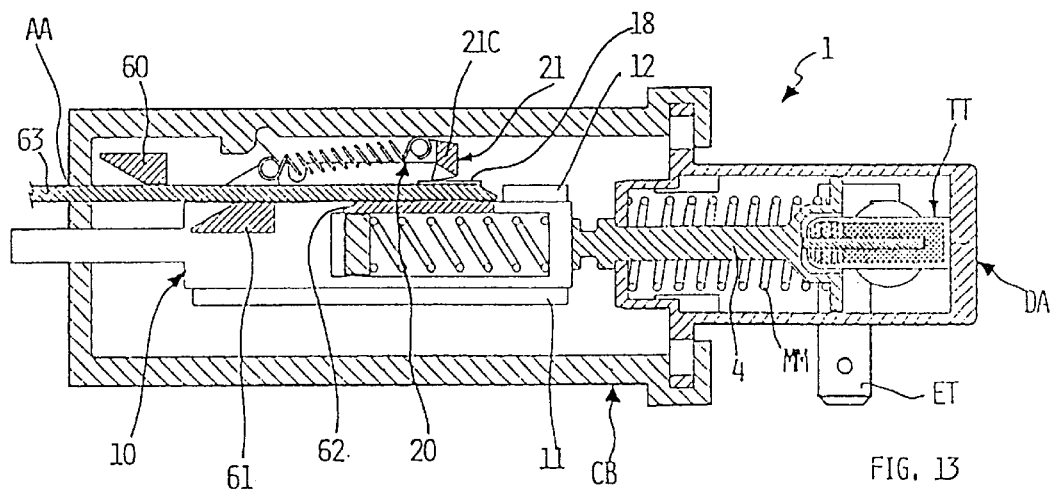

FIGS. 11–13 represent, by means of sections being similar to the one of FIG. 4, a particularly advantageous embodiment of the actuation device according to the present invention. According to such an embodiment, the actuation device 1 is equipped with means apt to allow an easy manual resetting of the device with a tool 63, similar to a screwdriver, if required.

The body 3 has an opening AA on its front, for inserting said tool 63, and internal guide elements for the latter, so as to realize the disengagement between the hook 21 and the relief 18. In the given example, the guide elements indicated with 60, 61 and 62 are delimited by protrusions of the side walls of the body 3 and are aligned with the opening AA, in order to direct the end of the tool 63 in the direction of the hook 21 of the element 20.

As can be seen, such an end of the tool 63 has a slanting surface and the hook 21 a side projection 21C, having a lower surface whose slanting is congruent with the surface of the end of the tool 63; the various elements are so arranged that, by inserting the tool 63 from the front side of the body 3, through the opening AA, it will be directed by the guide elements 60–61 to slide sideways to the relief 18 until its slanting end comes into contact with the slanting surface of the side projection 21C.

Operation of the resetting system shown in FIGS. 11–13 is very simple. Let us assume for instance that the device 1 is used to lock an oven door and is in a condition as shown in FIG. 6, i.e. where the device 1 is in a stable door lock position, which has been reached following a first action of the actuator DA (see for instance the above description with reference to FIGS. 4–6). Let us also assume that once such a stable condition has been reached, an extended electric blackout or a fault in the oven control system, which does not allow a new operation cycle of the actuator DA for the door release, occurs. In such a situation, the tool 63 is inserted in the proper opening AA in the body 3, with the slanting part of its end being directed upwards.

Thus, as it can be seen in FIG. 11, the elements 60–62 guide the insertion of the tool 63 in the body 3, until the slanting end of the latter comes in contact with the lower slanting surface of the projection 21C of the hook 21.

As can be seen in FIG. 12, by continuing in the thrust action, the end of the tool 63 works like a wedge with respect to the projection 21C, and determines the uplifting of the hook 21 with its consequent disengagement from the relief 18. Now, therefore, the slider 10 is released from the hooking element 20 and can go backward under the action of the spring MO; on the other side, as it can be seen in FIG. 13, the hooking element 20 goes back to its starting position, i.e. the one prior to the first complete operating cycle of the device 1 actuated by the actuator DA (as shown in FIG. 4). The oven door is consequently released and can be opened; the tool 63 can be extracted from the body 3 through the opening AA.

From the above description the features and the advantages of the actuation device according to the present invention are clear. In particular, an actuation device 1 has been described, which is capable of changing its operating condition between a stable rest position and a stable work position, comprising
- a monostable actuation unit DA, having a body 2 and at least a shaft 4 being movable as a function of the energization available or not to the actuation unit DA;
- a kinematic motion assembly CB for converting the movement of the shaft 4 into a bistable actuation, which comprise a slider 10 being linearly movable under the action of the shaft 4 and means 15–25 for converting subsequent linear movements of the shaft 4 in the passage of the slider 10 between said stable positions and the maintaining of the same.

According to the invention, elements 15–25 are arranged sideways to the slider 10, with reference to the motional direction of the latter, where subsequent movements of the slider 10 cause at least a displacement of a hooking element 20 being part of the means 15–25 between at least a first and a second position; in the first position the means 15–25 maintain the slider 10 in the stable work position and in the second position the means 15–25 allow the slider 10 to pass in the stable rest position.

Following subsequent movements of the slider 10, the hooking element 20 is capable of oscillating between at least a first position, in which a retaining part 21 of the hooking element 20 maintains the slider 10 in a stable work condition, and a second position, where said retaining part 21 allows the slider 10 to return to said stable rest condition.

It should be noticed, to this purpose, that the hooking element 20 according to the present invention can be arranged sideways to the slider 10 and within its length encumbrance, with the consequent possibility of reducing the device length as a whole. It should also be noticed that the presence of the hooking element 20 does not determine any movement conversion, for example from linear to angular, of the movement type of the thrust elements of the kinematic motion assembly (shaft 4 and slider 10), thus avoiding a risk of losses in the actuation force.

Finally, as said, the device according to the present invention does not necessarily requires a housing, for covering completely the kinematic motion assembly, and the same can, if necessary, may be realized so as to be easily resettable.

The device according to the invention has wide application field with respect to the known devices, since it can operate correctly in restricted spaces, without using sophisticated control systems, under high loads and anyway at high and low electric supply voltages; moreover, it can be manually reset, if required.

It is clear that many changes are possible for the man skilled in the art to the device described above by way of example, without departing from the novelty spirit of the inventive idea. For instance, it is clear that instead of a PTC thermoelectric actuator, the device according to the present invention may be equipped with a different type of actuator, such as an electromagnetic, pneumatic or hydraulic one; moreover, the actuator employed does not necessarily need to be of the linear type, provided that it is able to cause a linear motion to the movable slider 10 (for instance by means of a cam system, etc.).

Moreover, the operation as described on a bidimensional plane might also occur on a tridimensional plane, using a different geometry and/or movements, and/or by means of different displacements of the fulcrum and/or the hook of the element 20. Additionally, the device according to the present invention may be advantageously provided with sensor means, for example for detecting the various working positions or for enabling the device operation in function of the presence or not of the required operating conditions.

It is also clear that the bistable actuation device represented and described as applied to a door-lock system for household appliances may be advantageously used for different applications, such as the opening/closing of flaps or shutters in air circulation conduits or valves.

It is to be appreciated that the foregoing is a description of preferred embodiments of the invention to which variations and modifications may be made without departing from the spirit and scope of the invention.

What is claimed is:

1. An actuation device capable of changing its operating condition between a stable rest position and a stable work position, comprising
- a monostable actuation unit, having a body and a shaft movable as a function of energization available to said actuation unit;
- a kinematic motion assembly for converting movement of said shaft into a bistable actuation, said kinematic motion assembly comprising a slider movable in response to movement said shaft,
- and means for converting subsequent linear movements of said shaft in a passage of said slider between said stable positions, said converting means comprising a hooking element,
- subsequent movements of said slider causing displacement of said hooking element between a first position and a second position, in said first position said converting means maintaining said slider in said stable work position and in said second position said converting means allowing said slider to pass to said stable rest position, whereby said hooking element comprises a first hooking means and a second hooking means, wherein in said first position, said first hooking means is engaged with said slider and said second hooking means is engaged in a first seat being fixed relative to said slider, and in said second position, said second hooking means is disengaged from said first seat.

2. A device, according to claim 1, wherein said hooking element oscillates between said first position, in which said first hooking means maintains said slider in said stable work position, and said second position, in which said first hooking means allows said slider to pass to said stable rest position.

3. A device, according to claim 1, whereby said converting means is arranged laterally of said slider within the length of said slider.

4. A device, according to claim 1, wherein a second seat is provided with which a portion of said hooking element can engage, said first seat and said second seat being in fixed relative positions.

5. A device, according to claim 1, wherein said monostable actuation unit is of the linear type.

6. A device, according to claim 1, wherein said hooking element has no fixed positioning constraints, and is free to oscillate, with a displacement of a fulcrum point, in different directions.

7. A device, according to claim 1, further comprising a first elastic element for inducing a swinging motion of said hooking element, said first elastic element having an axis running in a direction that changes during different operating phases of the device, so as to induce in said hooking element movements in opposite angular directions.

8. A device, according to claim 4, wherein said first seat has a cavity facing in one direction and said second seat has a cavity facing in a direction opposite to said one direction.

9. A device, according to claim 4, wherein said second seat has, with reference to the thrust direction of said shaft, a more advanced position than said first seat.

10. A device, according to claim 4, whereby said first seat is disposed at a height different from the height of said second seat.

11. A device, according to claim 4, wherein said hooking element has two extensions which alternately engage in said first and second seats.

12. A device, according to claim 11, wherein said extensions are respectively defined on opposite sides of said hooking element.

13. A device, according to claim 1, further comprising guide means which constrain said slider to a linear movement.

14. A device, according to claim 1, further comprising guide means, said first seat being defined in said guide means for constraining said slider to a linear movement.

15. A device, according to claim 1, further comprising a second elastic element, said slider being movable, under the thrust produced by said shaft, in opposition to the action of said second elastic element.

16. A device, according to claim 2, wherein said hooking means has a first slanting surface and said slider has a second slanting surface engageable by said first slanting surface.

17. A device, according to the claim 16, wherein said second slanting surface is delimited by a hooking extension of said slider.

18. A device, according to claim 7, wherein said slider has an extension and said hooking element has a third extension, an end of said first elastic element being fastened to said extension of said slider, the other end of said first elastic element being fastened to said third extension of said hooking element.

19. A device, according to claim 1, wherein said hooking element has a slanting surface which is slideable on a portion of said slider.

20. A device, according to claim 11, wherein said hooking element has a slanting surface which is slideable on a portion of said slider, a surface of said portion of said slider being slideable with respect to said slanting surface during a linear movement of said slider in a direction opposite to the direction of actuation of said actuation unit, in order to promote engagement of one of said two extensions in said second seat.

21. A device, according to claim 4, wherein said kinematic motion assembly has a body with a wall, and at least one of said first seat and said second seat is within said wall of said body.

22. A device, according to claim 1, wherein said actuation unit and said bistable kinematic motion assembly are housed in two distinct bodies respectively, which can be mutually coupled, the body housing said kinematic motion assembly being part of an adaptor for transforming said monostable actuation unit into a bistable actuation device.

23. A device, according to claim 22, further comprising means for coupling said distinct bodies.

24. A device, according to claim 1, wherein said monostable actuation unit comprises a thermal actuator having a housing which is thermally responsive to an electric heater, and a thermally expansible material within a chamber in said housing.

25. A device, according to claim 24, further comprising a piston inserted at least partially into said chamber, whereby expansion of said expansible material in response to a temperature increase induced by said heater, produces a thrust on said piston towards the outside of said housing.

26. A device, according to claim 1, further comprising manual resetting means for resetting said kinematic motion assembly.

27. A device, according to claim 26, further comprising a housing in which said kinematic motion assembly is disposed, and a tool mounted within said kinematic motion assembly housing, wherein said manual resetting means comprises an element for guiding said tool.

28. A device, according to claim 26, wherein said manual resetting means comprises a projection of said hooking means which has a surface congruent with a surface of an end of said tool.

29. An actuation device capable of changing its operating condition between a stable rest position and a stable work position, comprising a monostable actuation unit, having a body and a shaft movable as a function of energization available to said actuation unit;

a kinematic motion assembly for converting movement of said shaft into a bistable actuation, said kinematic motion assembly comprising a slider movable in response to movement of said shaft, means for converting subsequent movements of said shaft in the passage of said slider between said stable positions and maintaining same, said converting means comprising a hooking element, subsequent movements of said slider causing a displacement of said hooking element between a first position and a second position, in said first position said converter means maintaining said slider in said stable work position and in said second position said converter means allowing said slider to pass to said stable rest position, whereby said hooking element is arranged between a first seat and a second seat for alternately engaging in said first seat and second seat in response to movement of said slider, said hooking element maintaining said slider in said stable work position when said hooking element engages in one of said seats.

30. An actuation device capable of changing its operating condition between a stable rest position and a stable work position, comprising a monostable actuation unit, having a body and a shaft movable as a function of energization available to said actuation unit;

a kinematic motion assembly for converting movement of said shaft into a bistable actuation, said kinematic motion assembly comprising a slider movable in response to movement of said shaft, means for converting subsequent movements of said shaft in the passage of said slider between said stable positions and maintaining same, said converting means being arranged laterally of said slider, whereby said hooking element, following subsequent movements of said slider, is capable of oscillating between a first position in which a retaining part of said hooking element maintains said slider in said stable work position, and a second position in which said retaining part allows said slider to pass to said stable rest position, whereby said hooking element has no fixed positioning constraints and is free to oscillate with a displacement of its fulcrum point.

31. An actuation device capable of changing its operating condition between a stable rest position and a stable work position, comprising a monostable actuation unit, having a body and at least a shaft movable as a function of energization available to said actuation unit;

a kinematic motion assembly for converting movement of said shaft into a bistable actuation, said kinematic motion assembly comprising a slider movable in response to movement of said shaft, means for converting subsequent movements of said shaft in a passage of said slider between said stable positions and maintaining same, said converting means being arranged laterally of said slider and comprising a hooking element and an elastic element for inducing motion of said hooking element, subsequent movements of said slider causing a displacement of said hooking element between a first position and a second position, in said first position said converting means maintaining said slider in said stable work position and in said second position said converting means allowing said slider to pass to said stable rest position, whereby the direction of an axis of said elastic element is variable for inducing movement of said hooking element in opposite angular directions.

32. An actuation device capable of changing its operating condition between a stable rest position and a stable work position, comprising a monostable actuation unit having a body and a shaft movable as a function of energization available to said actuation unit;

a kinematic motion assembly for converting movement of said shaft into a bistable actuation, said kinematic motion assembly comprising a slider movable in response to movement of said shaft, means for converting subsequent movements of said shaft in a passage of said slider between said stable positions and maintaining same, said converting means comprising a hooking element, subsequent movements of said slider causing displacement of said hooking element between a first position and a second position, in said first position said means maintaining said slider in said stable work position and in said second position said means allowing said slider to pass to said stable rest position, whereby said hooking element can swing between a first seat and a second seat for alternately engaging said first seat and second seat in response to movement of said slider, said first seat serving as a first fulcrum for the swinging motion of said hooking element and said second seat alternatively serving as a second fulcrum for the swinging motion of said hooking element.

* * * * *